(12) United States Patent
Boncimino

(10) Patent No.: US 10,586,231 B2
(45) Date of Patent: Mar. 10, 2020

(54) RECEIPT RETRIEVAL BASED ON LOCATION

(71) Applicant: PayPal, Inc., San Jose, CA (US)

(72) Inventor: Christopher Boncimino, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 165 days.

(21) Appl. No.: 15/924,216

(22) Filed: Mar. 18, 2018

(65) Prior Publication Data

US 2018/0300725 A1    Oct. 18, 2018

Related U.S. Application Data

(63) Continuation of application No. 14/040,447, filed on Sep. 27, 2013, now Pat. No. 9,922,325.

(60) Provisional application No. 61/724,834, filed on Nov. 9, 2012.

(51) Int. Cl.
```
G06Q 20/40    (2012.01)
G06Q 20/32    (2012.01)
G06Q 20/04    (2012.01)
G06Q 30/00    (2012.01)
G06Q 10/10    (2012.01)
G06Q 20/10    (2012.01)
G06Q 50/00    (2012.01)
G06Q 30/06    (2012.01)
G06Q 20/22    (2012.01)
```

(52) U.S. Cl.
CPC ......... *G06Q 20/4014* (2013.01); *G06Q 10/10* (2013.01); *G06Q 20/0453* (2013.01); *G06Q 20/10* (2013.01); *G06Q 20/227* (2013.01); *G06Q 20/3224* (2013.01); *G06Q 20/4018* (2013.01); *G06Q 30/01* (2013.01); *G06Q 30/0633* (2013.01); *G06Q 50/01* (2013.01)

(58) Field of Classification Search
CPC ............. G06Q 20/4014; G06Q 20/227; G06Q 20/4018; G06Q 30/0633; G06Q 50/01; G06Q 20/10; G06Q 10/10; G06Q 30/01; G06Q 20/0453; G06Q 20/3224
See application file for complete search history.

(56) References Cited

U.S. PATENT DOCUMENTS

| | | | | |
|---|---|---|---|---|
| 6,249,773 B1 * | 6/2001 | Allard | ..................... | G06Q 30/06 705/26.8 |
| 6,795,710 B1 * | 9/2004 | Creemer | ............... | H04W 4/029 455/456.3 |
| 7,130,814 B1 * | 10/2006 | Szabo | ................. | G06Q 30/0201 705/26.8 |

(Continued)

*Primary Examiner* — Ashford S Hayles
(74) *Attorney, Agent, or Firm* — Haynes and Boone, LLP

(57) ABSTRACT

A user may request receipts near a current location of the user or a desired location specified by the user. Once a location or address is determined or obtained, a service provider can access a database or other storage to search for receipts for the user within a certain distance from the current user location or desired location. This distance can vary based on results found or density of merchants in the area. The distance can be predetermined by the system or the user. All valid receipts within this distance can then be presented to the user on the user device, such as indications on a map, associated with merchant names and transaction details or summaries, and/or other formats and information.

20 Claims, 3 Drawing Sheets

(56) References Cited

U.S. PATENT DOCUMENTS

| | | | | |
|---|---|---|---|---|
| 7,376,433 B1* | 5/2008 | Hose | H04W 4/029 | 455/466 |
| 7,552,087 B2* | 6/2009 | Schultz | G06Q 40/12 | 705/39 |
| 7,945,484 B1* | 5/2011 | Tam | G06Q 30/06 | 705/26.1 |
| 7,991,664 B1* | 8/2011 | Stone | G06Q 10/025 | 705/19 |
| 8,554,670 B1* | 10/2013 | Blank | G06Q 50/01 | 705/1.1 |
| 8,589,230 B1* | 11/2013 | Bickerstaff | G06Q 30/0251 | 705/14.4 |
| 8,600,835 B1* | 12/2013 | Lueck | G06Q 30/0283 | 705/26.1 |
| 8,756,159 B1* | 6/2014 | Gibson | G06Q 40/02 | 705/35 |
| 8,788,350 B2* | 7/2014 | McKenna | G06Q 20/0453 | 705/17 |
| 8,843,398 B2* | 9/2014 | Argue | G06Q 20/3278 | 705/16 |
| 8,868,522 B1* | 10/2014 | Zennaro | G06F 16/29 | 707/694 |
| 2002/0026380 A1* | 2/2002 | Su | G06Q 30/06 | 705/26.8 |
| 2003/0055733 A1* | 3/2003 | Marshall | G06Q 20/0453 | 705/24 |
| 2004/0078282 A1* | 4/2004 | Robinson | G06Q 30/04 | 705/26.1 |
| 2005/0010505 A1* | 1/2005 | Darrell | G06Q 20/0453 | 705/35 |
| 2005/0256781 A1* | 11/2005 | Sands | G06Q 10/087 | 705/26.8 |
| 2006/0157564 A1* | 7/2006 | Schulte | G06Q 30/02 | 235/383 |
| 2007/0045405 A1* | 3/2007 | Rothschild | G06Q 20/20 | 235/380 |
| 2007/0164106 A1* | 7/2007 | McDevitt | G06Q 20/0453 | 235/383 |
| 2008/0268868 A1* | 10/2008 | Maitland | G06Q 30/02 | 455/456.1 |
| 2008/0313062 A1* | 12/2008 | Williams | B60S 5/02 | 705/30 |
| 2008/0313066 A1* | 12/2008 | Sholtis | G06Q 30/06 | 705/35 |
| 2009/0069033 A1* | 3/2009 | Karstens | H04W 4/029 | 455/456.3 |
| 2009/0150272 A1* | 6/2009 | Blythe | G06Q 40/00 | 705/35 |
| 2009/0271265 A1* | 10/2009 | Lay | G06Q 20/0453 | 705/14.38 |
| 2009/0271322 A1* | 10/2009 | Lay | G06Q 20/0453 | 705/75 |
| 2009/0327134 A1* | 12/2009 | Carlson | G06Q 20/04 | 705/44 |
| 2010/0006646 A1* | 1/2010 | Stiller | G06Q 10/087 | 235/383 |
| 2010/0082454 A1* | 4/2010 | Narayanaswami | G06Q 20/20 | 705/26.1 |
| 2010/0179881 A1* | 7/2010 | Wiederstein | G06Q 10/087 | 705/26.1 |
| 2010/0305855 A1* | 12/2010 | Dutton | H04W 4/18 | 701/469 |
| 2010/0331016 A1* | 12/2010 | Dutton | H04W 4/18 | 455/456.3 |
| 2012/0078682 A1* | 3/2012 | Pinsley | G06Q 30/0201 | 705/7.29 |
| 2012/0084135 A1* | 4/2012 | Nissan | G06Q 30/0238 | 705/14.38 |
| 2012/0101876 A1* | 4/2012 | Turvey | G06Q 30/02 | 705/14.1 |
| 2012/0109693 A1* | 5/2012 | Smith | G06Q 20/204 | 705/4 |
| 2012/0150704 A1* | 6/2012 | Acklam | G06Q 40/123 | 705/31 |
| 2012/0221446 A1* | 8/2012 | Grigg | G06Q 30/04 | 705/30 |
| 2012/0290383 A1* | 11/2012 | Busch | G06Q 30/02 | 705/14.36 |
| 2012/0290389 A1* | 11/2012 | Greenough | G06Q 30/0261 | 705/14.53 |
| 2012/0290422 A1* | 11/2012 | Bhinder | G06Q 20/0453 | 705/21 |
| 2012/0290609 A1* | 11/2012 | Britt | G06Q 30/06 | 707/769 |
| 2013/0046602 A1* | 2/2013 | Grigg | G06Q 30/0261 | 705/14.25 |
| 2013/0046626 A1* | 2/2013 | Grigg | G06Q 30/0207 | 705/14.53 |
| 2013/0046717 A1* | 2/2013 | Grigg | G06Q 30/02 | 706/46 |
| 2013/0073377 A1* | 3/2013 | Heath | G06Q 30/02 | 705/14.39 |
| 2013/0110659 A1* | 5/2013 | Phillips | G06Q 20/0453 | 705/24 |
| 2013/0151344 A1* | 6/2013 | Tavares | G06Q 30/00 | 705/14.65 |
| 2013/0159077 A1* | 6/2013 | Stringfellow | G06Q 30/02 | 705/14.16 |
| 2013/0173456 A1* | 7/2013 | Grigg | G06Q 20/3221 | 705/39 |
| 2013/0196689 A1* | 8/2013 | Smith | H04W 4/21 | 455/456.3 |
| 2013/0211936 A1* | 8/2013 | Sulaiman | H04L 9/3234 | 705/17 |
| 2013/0268340 A1* | 10/2013 | Colon | G06Q 40/08 | 705/14.25 |
| 2013/0304578 A1* | 11/2013 | Kannan | G06Q 30/0261 | 705/14.54 |
| 2014/0006129 A1* | 1/2014 | Heath | G06Q 30/0222 | 705/14.23 |
| 2014/0025515 A1* | 1/2014 | Argue | G06Q 20/0453 | 705/21 |
| 2014/0067575 A1* | 3/2014 | Nevada | G06Q 20/20 | 705/24 |
| 2014/0067676 A1* | 3/2014 | Woodall | G06Q 20/322 | 705/44 |
| 2014/0074675 A1* | 3/2014 | Calman | G06Q 40/12 | 705/35 |
| 2014/0095063 A1* | 4/2014 | Saraswat | G06Q 30/0224 | 701/410 |
| 2014/0156410 A1* | 6/2014 | Wuersch | G06Q 30/0261 | 705/14.58 |
| 2014/0180793 A1* | 6/2014 | Boal | G06Q 30/0245 | 705/14.43 |
| 2014/0188648 A1* | 7/2014 | Argue | G06Q 30/0601 | 705/26.1 |
| 2014/0195361 A1* | 7/2014 | Murphy | G06Q 20/0453 | 705/21 |
| 2014/0244462 A1* | 8/2014 | Maenpaa | G06Q 20/0453 | 705/35 |
| 2014/0279494 A1* | 9/2014 | Wiesman | G06Q 20/3224 | 705/44 |
| 2014/0289047 A1* | 9/2014 | Yee | G06Q 30/0261 | 705/14.58 |
| 2014/0379467 A1* | 12/2014 | Huang | G06Q 30/0281 | 705/14.53 |
| 2015/0088714 A1* | 3/2015 | Votaw | G06Q 50/01 | 705/35 |
| 2015/0310564 A1* | 10/2015 | Peterson | G06F 16/29 | 705/30 |

* cited by examiner

RECEIPT RETRIEVAL BASED ON LOCATION

CROSS REFERENCE TO RELATED APPLICATIONS

This continuation patent application claims priority to and the benefit of U.S. patent application Ser. No. 14/040,447, filed Sep. 27, 2013, which will issue as U.S. Pat. No. 9,922,325 on Mar. 20, 2018 and pursuant to 35 U.S.C. § 119(e), this application claims priority to the filing date of U.S. Provisional Patent Application No. 61/724,834, filed on Nov. 9, 2012, the disclosure of which is hereby incorporated by reference in its entirety.

BACKGROUND

Field of the Invention

The present invention generally relates to electronic receipts and more particularly to electronic receipt retrieval.

Related Art

When a consumer desires to make a return of a purchased item, the consumer typically needs to locate the original receipt in order to make the return at a merchant site. The receipt is typically a paper receipt, which may be stored at a consumer house or office. More recent receipts may be stored in a consumer's physical wallet. Regardless, the consumer needs to locate and bring the receipt for the return process. This can be time-consuming and sometimes impossible if the receipt has been lost or destroyed.

More recently, electronic receipts are being used, such as attached or part of an email or stored with a user's account with a merchant or payment provider. Such receipts may be easier to locate and are in little danger of being lost or destroyed. However, even with such electronic receipts, the user still has to electronically search for a desired receipt, which may be time-consuming and inconvenient, especially if the user is using a mobile device with a small screen and more limited functionality than a PC.

It would be desirable to provide the consumer another way to retrieve receipts that is more convenient than conventional methods.

Figure 1:
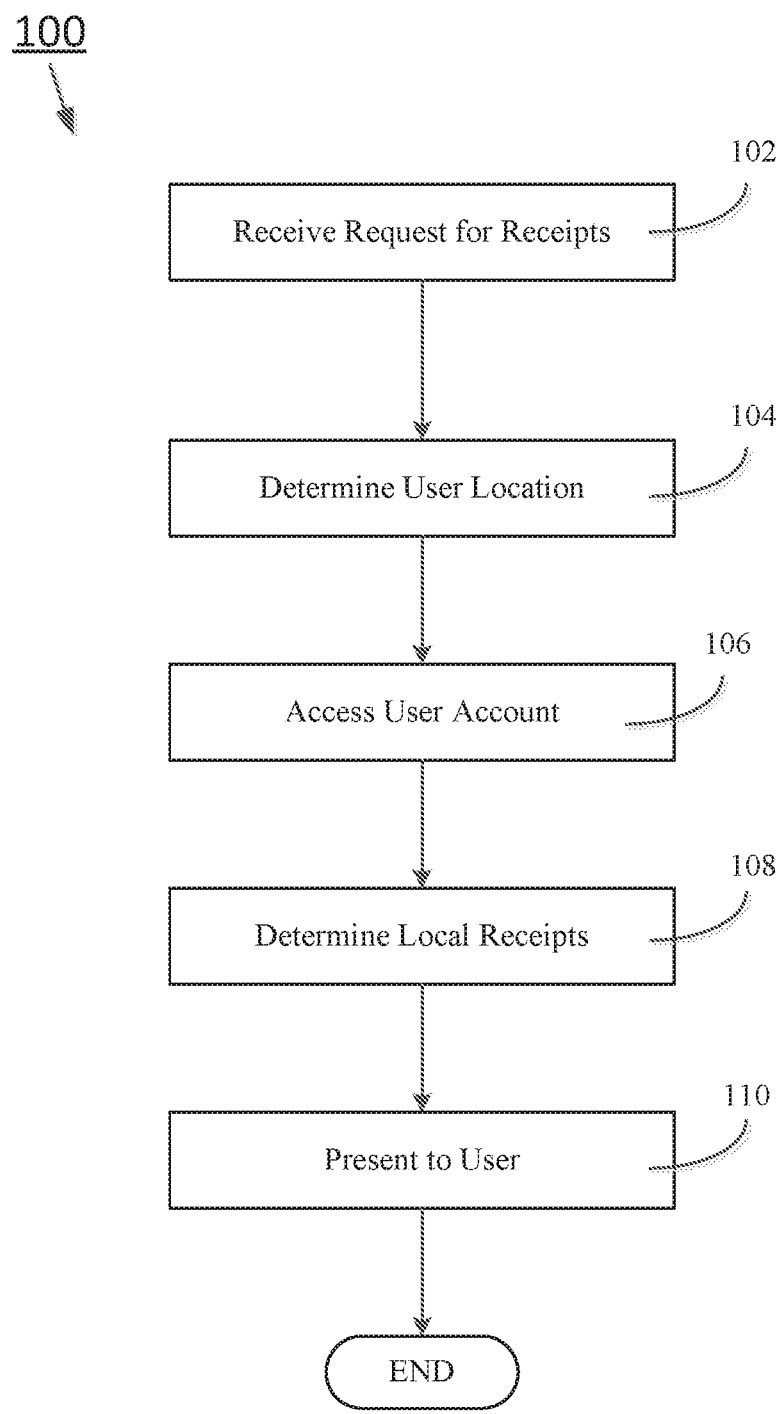
FIG. 1 is a flowchart showing a process for retrieving receipts based on a user location according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to various embodiments, when a user makes a purchase, an electronic receipt is stored, either in the user device and/or with a user online account, such as on a server on in the cloud. The electronic receipt includes location information about where the purchase was made. The location information may be an address of the merchant/seller, latitude/longitude coordinates, or other location information. The user may request receipts near a current location of the user, such as through the user mobile device. The location of the user device can be used to determine the user location, such as through a GPS functionality within the mobile device. The user may also enter a desired location, such as by entering an address through a device keypad or voice function, or select a location from a drop down menu or other list of locations. Once a location or address is determined or obtained, a service provider, such as PayPal, Inc., can access a database or other storage to search for receipts for the user within a certain distance from the current user location or desired location. This distance can vary based on results found or density of merchants in the area. The distance can be predetermined by the system or the user. All valid receipts within this distance can then be presented to the user on the user device, such as indications on a map, associated with merchant names and transaction details or summaries, and/or other formats and information. As a result, a user can quickly and easily retrieve receipts from nearby or location-specific sellers/merchants so that the user can select a desired receipt for use, such as return of a purchased item at the nearby or specific merchant.

FIG. 1 is a flowchart showing a process 100 for retrieving receipts based on a user location according to one embodiment. Receipts may be electronic or digital receipts, including barcode receipts, which have been stored after a purchase by the user. The receipts maybe stored in any suitable location or means, such as in a cloud, on the user device, in a database of a service provider, etc. The receipt may include various information about the purchase, such as merchant name, merchant location, day of purchase, time of purchase, total amount, individual amounts for each item purchased, descriptions of item(s), tax, funding source used, discounts/incentives applied (if any), user loyalty number, and/or any other information conventionally or expected to be found in a receipt.

At step 102, a service provider, which can be a payment provider, a receipt manager, or any other suitable service provider, receives a request from the user, at step 102, for retrieving receipts. The request may be received through a user device, such as a smartphone, computing tablet, PC, wearable device (e.g., Google Glass, smart watch, etc.) or other suitable device. The user may access an app on a device or otherwise access the service provider site. This may include providing user authentication, such as the user entering a valid user identifier (name, phone number, email address, etc.) and a PIN or password. Once authenticated, the user may be directed to a home page of the user's account, where the app or site may include an option the user can select for requesting local or location-specific receipts. The option may be in the form of a tab, link, button or box selectable by the user, such as by tapping, clicking, checking a box, or the like.

Next, at step 104, the user location may be determined. User location may be determined through a location function in the user device, such as a GPS function. The user location may also be determined by user manual entry of a location. For example, the user may enter an address, which does not need to be at or near the user's current actual location. This may be useful if the user will be at a certain location in an hour and wants to know beforehand all receipts near that location, but not necessarily receipts at the user's current location. Other ways for the service provider to obtain location information may also be suitable, such as, but not limited to, tapping or otherwise selecting a location on a map displayed on the user device, selecting an address or location from a drop down menu or other list of locations where the list can be locations where the user has made purchases or has frequented in the past.

The service provider may also access, at step 106, the user's account with the service provider. Account access may be through the login or authentication credentials entered (earlier or now) by the user. Once accessed, the service provider may locate all stored electronic receipts associated with purchases by the user. The receipts may be received and stored through direct integration with merchants, so that upon successful purchase, the receipts can be obtained directly through or from the merchant using known techniques. Receipts may also be obtained from the user. For example, after purchase, the user may receive an electronic receipt from the merchant, such as through email. The user may then forward the email receipt to the service provider for storage. Receipts from the merchant may be directly sent to the user or sent to a service or payment provider who then stores the receipt in a user account. Regardless of how the service provider obtains the receipts, the receipts must contain location information of where the purchase was made. Location information may be automatically included in the receipt through a location determining component of the merchant, such as in a POS or checkout device. Location information may include an address, latitude/longitude coordinates, or any other suitable information that enables a specific location or area to be determined. The location information may be printed or visible on the electronic receipt, such as a merchant address, or be tagged or otherwise associated with the receipt, but not actually on the receipt.

Next, at step 108, local receipts are determined based on the location (current or desired) of the user from step 104. From the location, the service provider may determine which receipts are from purchases made from merchants within a certain distance of that location. The distance may be determined by the user or the service provider. For example, the user may want receipts one mile from the location, which the user can preset through the user's account or specify during the receipt request. The service provider may also set the distance, which can be static or dependent upon the user's location. For example, the system may set the distance to be two miles regardless of user location. Alternatively, the system may adjust the distance depending on location. If the user location is in an area where there are many receipts, the distance may be shorter. In this case, the user location may be in a densely populated shopping area. On the other hand, the service provider may set the distance to a longer distance if there are not many receipts in the area, such as in a sparsely populated shopping area. The distance may also depend on the speed of travel of the user when the user requests the receipts. For example, if the user is determined to be traveling at a high rate of speed (such as determined through movement of the user's device), the user may be assumed to be in a car or other motor vehicle. As such, the distance may be greater, since it may not take much time for the user to reach a desired destination compared to if the user was traveling by foot or bicycle. In the latter situation, where the user is determined to be moving slowly or not at all, the distance may be much shorter.

Receipts within the determined distance can then be retrieved or obtained from the service provider, such as through a search of a service provider database containing account information of the user, merchant databases, financial software programs utilized by the user, and/or third party services or databases.

Once the "local" receipts are determined, the receipts are presented to the user at step 110. The local receipts may be presented in any suitable way on a user device. For example, the user device may display a map of the area of the user location, and receipt locations (locations where purchases corresponding to the receipt were made) may be marked on the map. The map may also include merchant names and receipt information, such as the number of receipts at each merchant. Other information may include amount of the receipt, date of the receipt, type of purchase, or any other information available from or that can be summarized from the receipt.

Selecting the merchant corresponding to the receipt may provide more detailed information about the receipts, such as amount, date, product, etc., if not already provided from the first view or display. Receipts may also be shown in other ways, such as in the form of a list. The list can be organized by merchant name, distance from the user location, merchants with the most receipts, by most recent purchases, by highest dollar amounts, etc. Once presented with receipts local to the user location, the user may easily select a desired receipt, such as by tapping on the receipt or checking a box or boxes associated with the receipt(s), to save or to display. Saved receipts may be put into an images folder easily accessible by the user or another area on the user device, where the user can select the receipt for display. Receipts may be displayed as an image of the actual receipt or in barcode (or other machine readable code, such as a QR code) that can be scanned by a merchant device. Thus, the user can quickly retrieve a receipt for use as needed, such as showing to a merchant for return of a purchase. For example, the merchant may simply scan, view, or process the receipt from the user device display.

Note that one or more steps or actions described above may be omitted, combined, and/or performed in a different sequence as appropriate.

Figure 2:
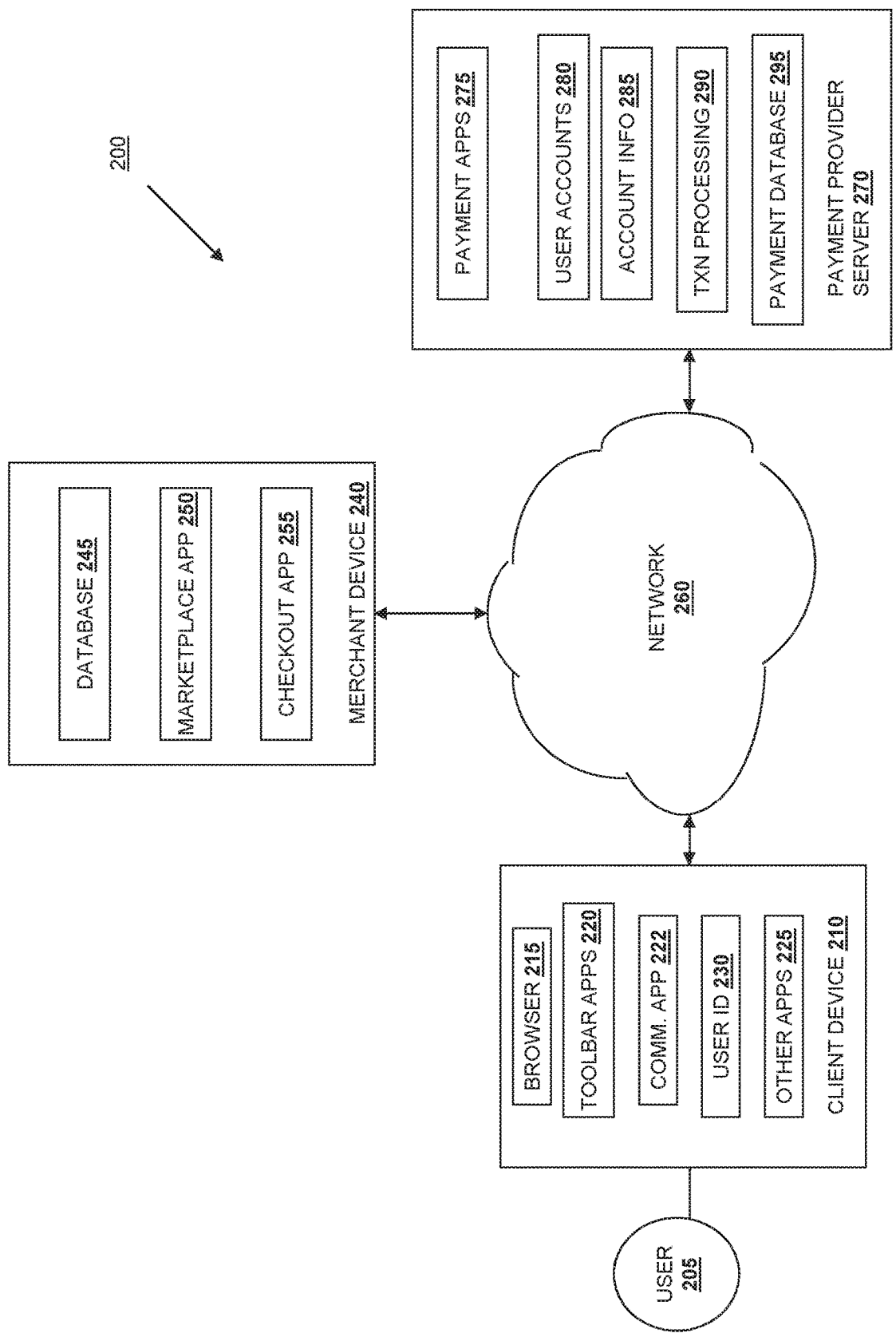
FIG. 2 is block diagram of a networked system suitable for implementing the process described herein according to an embodiment.

FIG. 2 is a block diagram of a networked system 200 configured to provide locations a user can redeem an offer at an event venue, such as described above, in accordance with an embodiment of the invention. System 200 includes a user device 210, a merchant server 240, and a payment provider server 270 in communication over a network 260. Payment provider server 270 may be maintained by a payment provider, such as PayPal, Inc. of San Jose, Calif. A user 205, such as a consumer, utilizes user device 210 to perform a transaction using payment provider server 270. Note that transaction, as used herein, refers to any suitable action performed using the user device, including payments, transfer of information, display of information, etc. Although only one merchant server is shown, a plurality of merchant servers may be utilized.

User device 210, merchant server 240, and payment provider server 270 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

Network 260 may be implemented as a single network or a combination of multiple networks. For example, in various embodiments, network 260 may include the Internet or one or more intranets, landline networks, wireless networks, and/or other appropriate types of networks.

User device 210 may be implemented using any appropriate hardware and software configured for wired and/or wireless communication over network 260. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 210 may include one or more browser applications 215 which may be used, for example, to provide a convenient interface to permit user 205 to browse information available over network 260. For example, in one embodiment, browser application 215 may be implemented as a web browser configured to view information available over the Internet, such as merchant site for purchasing. User device 210 may also include one or more toolbar applications 220 which may be used, for example, to provide client-side processing for performing desired tasks in response to operations selected by user 205, such as purchases from a selected merchant site or app. In one embodiment, toolbar application 220 may display a user interface in connection with browser application 215.

User device 210 may further include other applications 225 as may be desired in particular embodiments to provide desired features to user device 210. For example, other applications 225 may include security applications for implementing client-side security features, programmatic client applications for interfacing with appropriate application programming interfaces (APIs) over network 260, or other types of applications. Applications 225 may also include email, texting, voice and IM applications that allow user 205 to send and receive emails, calls, and texts through network 260, as well as applications that enable the user view maps of an event venue as discussed above. User device 210 includes one or more user identifiers 230 which may be implemented, for example, as operating system registry entries, cookies associated with browser application 215, identifiers associated with hardware of user device 210, or other appropriate identifiers, such as used for payment/user/device authentication. In one embodiment, user identifier 230 may be used by a payment service provider to associate user 205 with a particular account maintained by the payment provider. A communications application 222, with associated interfaces, enables user device 210 to communicate within system 200.

Merchant server 240 may be maintained, for example, by a merchant or seller offering various products and/or services in exchange for payment to be received over network 260. Merchant server 240 may be used for POS (offline) or online purchases and transactions, as well as for communicating information associated with a purchase, such as electronic receipts and associated information. Generally, merchant server 240 may be maintained by anyone or any entity that receives money, which includes charities as well as retailers and restaurants, and provides receipts. Merchant server 240 includes a database 245 identifying available products and/or services (e.g., collectively referred to as items) which may be made available for viewing and purchase by user 205. Merchant server 240 also includes a marketplace application 250 which may be configured to serve information over network 260 to browser 215 of user device 210. In one embodiment, user 205 may interact with marketplace application 250 through browser applications over network 260 in order to view various items for purchase identified in database 245.

Merchant server 240 also includes a checkout application 255 which may be configured to facilitate the purchase by user 205 of goods or services identified by marketplace application 250. Checkout application 255 may be configured to accept payment information from or on behalf of user 205 through payment service provider server 270 over network 260. For example, checkout application 255 may receive and process a payment confirmation from payment service provider server 270, as well as transmit transaction information to the payment provider and receive information from the payment provider (e.g., a transaction ID), including processing a shipment of purchased item(s) to the user and an electronic receipt directly to the payment provider and/or to the user.

Payment provider server 270 may be maintained, for example, by an online payment service provider which may provide payment between user 205 and the operator of merchant server 240. In this regard, payment provider server 270 includes one or more payment applications 275 which may be configured to interact with user device 210 and/or merchant server 240 over network 260 to facilitate the purchase of goods or services, communicate/display information, and send payments by user 205 of user device 210 and as discussed above.

Payment provider server 270 also maintains a plurality of user accounts 280, each of which may include account information 285 associated with individual users. For example, account information 285 may include private financial information of users of devices such as account numbers, passwords, device identifiers, user names, phone numbers, credit card information, bank information, or other financial information which may be used to facilitate online transactions by user 205. Account information may also include user purchase history, including details of items purchased and receipts as discussed herein. Advantageously, payment application 275 may be configured to interact with merchant server 240 on behalf of user 205 during a transaction with checkout application 255 to track and manage purchases made by users, including locations of purchases.

A transaction processing application 290, which may be part of payment application 275 or separate, may be configured to receive information from a user device and/or merchant server 240 for processing and storage in a payment database 295. Transaction processing application 290 may include one or more applications to process information from user 205 for processing an order, such for a purchase of an item at a merchant location. Payment application 275 may be further configured to determine the existence of and to manage accounts for user 205, as well as create new accounts if necessary, such as the setup, management, and use of payment accounts.

Figure 3:
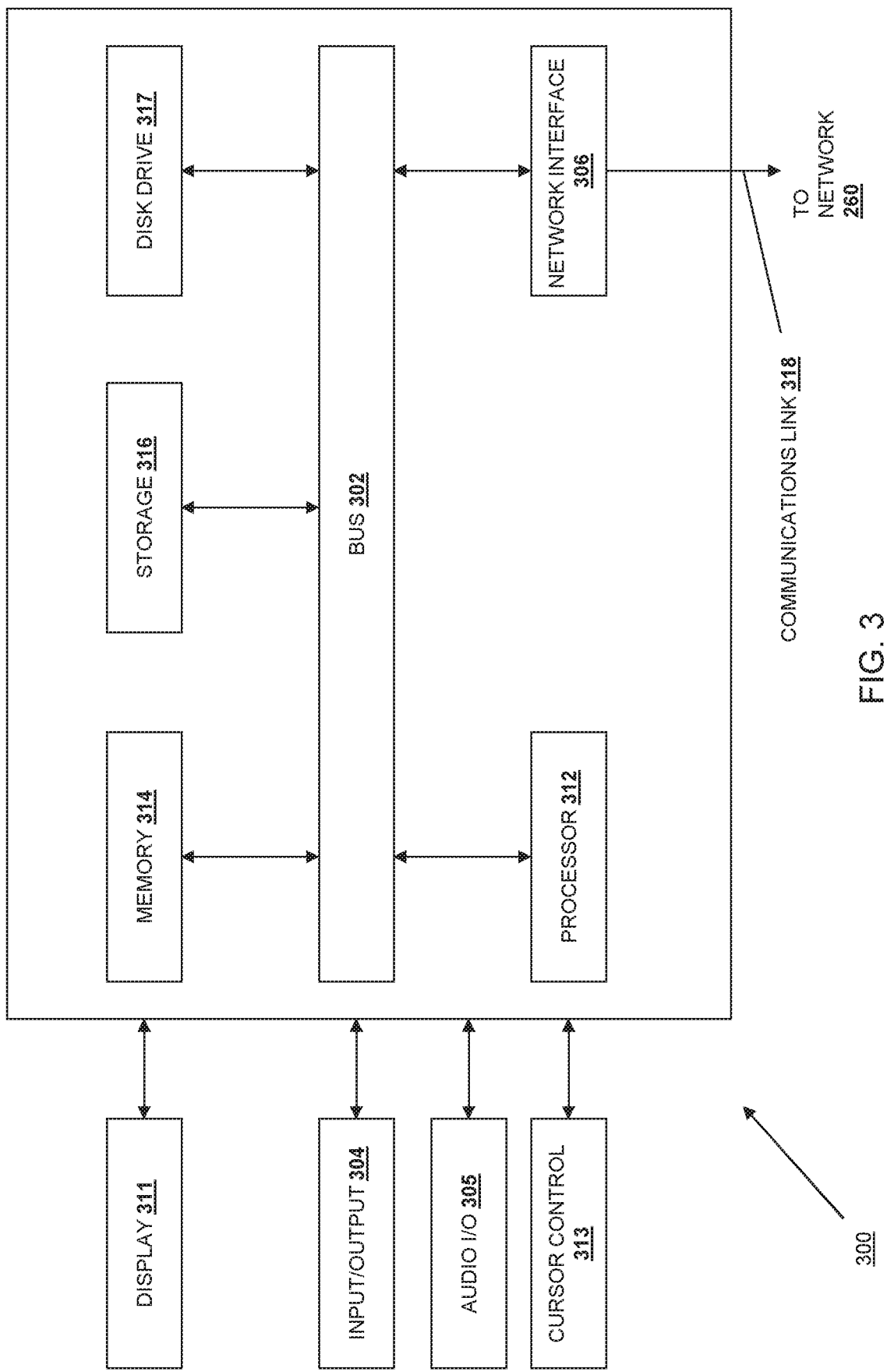
FIG. 3 is a block diagram of a computer system suitable for implementing one or more components in FIG. 2 according to one embodiment.

FIG. 3 is a block diagram of a computer system 300 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 300 in a manner as follows.

Computer system 300 includes a bus 302 or other communication mechanism for communicating information data, signals, and information between various components of computer system 300. Components include an input/output (I/O) component 304 that processes a user action, such as selecting keys from a keypad/keyboard, selecting one or more buttons or links, etc., and sends a corresponding signal to bus 302. I/O component 304 may also include an output component, such as a display 311 (capable of showing maps indicating merchant locations corresponding to "local" receipts) and a cursor control 313 (such as a keyboard, keypad, mouse, etc.). An optional audio input/output component 305 may also be included to allow a user to use voice for inputting information by converting audio signals. Audio I/O component 305 may allow the user to hear audio. A transceiver or network interface 306 transmits and receives signals between computer system 300 and other devices, such as another user device, a merchant server, or a payment provider server via network 260. In one embodiment, the transmission is wireless, although other transmission mediums and methods may also be suitable. A location determining component 320, such as a GPS system or chip or other devices/systems described herein, communicates with bus 302 to communicate location data that enables a service provider to determine the location of computer system 300. A processor 312, which can be a micro-controller, digital signal processor (DSP), or other processing component, processes these various signals, such as for display on computer system 300 or transmission to other devices via a communication link 318. Processor 312 may also control transmission of information, such as cookies or IP addresses, to other devices.

Components of computer system 300 also include a system memory component 314 (e.g., RAM), a static storage component 316 (e.g., ROM), and/or a disk drive 317. Computer system 300 performs specific operations by processor 312 and other components by executing one or more sequences of instructions contained in system memory component 314. Logic may be encoded in a computer readable medium, which may refer to any medium that participates in providing instructions to processor 312 for execution. Such a medium may take many forms, including but not limited to, non-volatile media, volatile media, and transmission media. In various implementations, non-volatile media includes optical or magnetic disks, volatile media includes dynamic memory, such as system memory component 314, and transmission media includes coaxial cables, copper wire, and fiber optics, including wires that comprise bus 302. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A device comprising:
   a non-transitory memory storing instructions; and
   a processor coupled to the non-transitory memory and configured to execute instructions to cause the device to:
   determine, based on electronic receipts associated with user purchases of a user and a user location, a plurality of merchant receipts associated with a plurality of merchants located within a first distance from the user location;
   determine a variable distance for the first distance based on one or more of a density of merchants for the plurality of merchant receipts at the first distance and a rate of travel of the user at the user location;
   adjust the first distance using the variable distance to obtain a second distance;
   update the plurality of merchant receipts for an adjusted plurality of merchants located within the second distance from the user location; and
   present the updated merchant receipts to the user on a user interface of a user device to enable the user to select a receipt from the updated merchant receipts via the user interface.

2. The device of claim 1, wherein the first distance is an initial distance specified in a user request for selecting a merchant receipt, wherein the updated merchant receipts comprise the merchant receipt.

3. The device of claim 1, wherein the user location is determined based on input from the user device that indicates a location of the user device.

4. The device of claim 1, wherein
said determining the plurality of merchant receipts comprises accessing account information of the user to obtain a plurality of electronic receipts associated with purchases by the user.

5. The device of claim 1, wherein the updated merchant receipts are displayed through a toolbar application on the user device.

6. The device of claim 1, wherein a respective each of the electronic receipts is associated with a location where a respective purchase was made by the user, the respective purchase resulting in the respective electronic receipt.

7. The device of claim 1, wherein the variable distance is further determined based on input received from a service provider that stores the electronic receipts.

8. The device of claim 1, wherein the variable distance is further determined based on a number of a subset of the electronic receipts for a subset of merchants that are located within the first distance to the user location.

9. The device of claim 1, wherein locations and contents of the updated merchant receipts are transmitted for display on a map displayed in the user interface.

10. A non-transitory machine-readable medium having instructions stored thereon, the instructions executable to cause performance of operations comprising:
determining, based on electronic receipts associated with user purchases of a user and a user location, a plurality of merchant receipts associated with a plurality of merchants located within a first distance from the user location;
determining a variable distance for the first distance based on one or more of a density of merchants for the plurality of merchant receipts at the first distance and a rate of travel of the user at the user location;
adjusting the first distance using the variable distance to obtain a second distance;
updating the plurality of merchant receipts for an adjusted plurality of merchants located within the second distance from the user location; and
providing the updated merchant receipts to the user on a user interface of a user device to enable the user to select a receipt from the updated merchant receipts via the user interface.

11. The non-transitory machine-readable medium of claim 10, wherein the first distance is an initial distance specified in a user request for selecting a merchant receipt, wherein the updated merchant receipts comprise the merchant receipt.

12. The non-transitory machine-readable medium of claim 10, wherein
said determining the plurality of merchant receipts comprises accessing account information of the user to obtain a plurality of electronic receipts associated with purchases by the user.

13. The non-transitory machine-readable medium of claim 10, wherein the updated merchant receipts are displayed through a toolbar application on the user device.

14. The non-transitory machine-readable medium of claim 10, wherein a respective each of the electronic receipts is associated with a location where a respective purchase was made by the user, the respective purchase resulting in the respective electronic receipt.

15. The non-transitory machine-readable medium of claim 10, wherein the variable distance is further determined based on a number of a subset of the electronic receipts for a subset of merchants that are located within the first distance to the user location.

16. A method comprising:
determining, based on electronic receipts associated with user purchases of a user and a user location, a plurality of merchant receipts associated with a plurality of merchants located within a first distance from the user location;
determining a variable distance for the first distance based on one or more of a density of merchants for the plurality of merchant receipts at the first distance and a rate of travel of the user at the user location;
adjusting the first distance using the variable distance to obtain a second distance;
updating the plurality of merchant receipts for an adjusted plurality of merchants located within the second distance from the user location; and
providing the updated merchant receipts to the user on a user interface of a user device to enable the user to select a receipt from the updated merchant receipts via the user interface.

17. The method of claim 16, wherein
said determining the plurality of merchant receipts comprises accessing account information of the user to obtain a plurality of electronic receipts associated with purchases by the user.

18. The method of claim 16, wherein the updated merchant receipts are displayed through a toolbar application on the user device.

19. The method of claim 16, wherein a respective each of the electronic receipts is associated with a location where a respective purchase was made by the user, the respective purchase resulting in the respective electronic receipt.

20. The method of claim 16, wherein the variable distance is further determined based on a number of a subset of the electronic receipts for a subset of merchants that are located within the first distance to the user location.

* * * * *